United States Patent [19]
White

[11] Patent Number: 5,727,814
[45] Date of Patent: Mar. 17, 1998

[54] MOTOR VEHICLE SAFETY RESTRAINT BLANKET

[76] Inventor: Stephen E. White, 1 Hudson St., New York, N.Y. 10013

[21] Appl. No.: 598,676

[22] Filed: Feb. 8, 1996

Related U.S. Application Data

[63] Continuation-in-part of Ser. No. 501,655, Jul. 12, 1995, abandoned.

[51] Int. Cl.$^6$ ............................................. B60R 21/02
[52] U.S. Cl. ........................... 280/748; 5/94; 280/750
[58] Field of Search ................................. 280/748, 749, 280/751; 297/464, 465, 468, 485; 5/494, 94 XC, 424, 630, 632, 81 T; 128/845, 846, 872, 869, 870

[56] References Cited

U.S. PATENT DOCUMENTS

| | | | |
|---|---|---|---|
| 4,143,914 | 3/1979 | Klich | 297/465 |
| 4,630,324 | 12/1986 | Fligsten et al. | 280/749 |
| 4,923,211 | 5/1990 | Klose | 280/749 |
| 5,290,086 | 3/1994 | Tucker | 280/749 |
| 5,375,879 | 12/1994 | Williams et al. | 280/749 |
| 5,529,341 | 6/1996 | Hartigan | 280/749 |
| 5,536,042 | 7/1996 | Williams et al. | 280/749 |

*Primary Examiner*—Eric D. Culbreth

[57] ABSTRACT

A reinforced woven blanket can be used to protect a passenger lying on a seat of a motor vehicle, by surrounding the entire torso with a single restraint that can use the known webbing, latch plates, buckles, and anchorage, that comply with today's federal requirements.

2 Claims, 2 Drawing Sheets

MOTOR VEHICLE SAFETY RESTRAINT BLANKET

This is a continuation in part of application number 08/501,655 with the filing date of Jul. 12, 1995, now abandoned.

BACKGROUND OF THE INVENTION

1. Field of the invention

The present invention relates to a motor vehicle safety restraint. Specifically, this invention relates to a safety restraint that would allow a passenger to sleep, lying down, while securely confined in the restraint. Without such a restraint, a child or any passenger in the rear seat of a motor vehicle must attempt sleep while slumped over in a lap-shoulder belt. If a driver is being disturbed by a cranky child, this can become a safety hazard which, at times, must be weighed against the hazard created by allowing the child to sleep unrestrained.

2. Prior Art

Although attempts have been made to address this problem, reclining or sleeping passengers in motor vehicles continue to be at rise These attempts have not been thoroughly successful, especially in light of recent findings concerning the dangers of relying solely on lap belts.

One such attempt is disclosed in U.S. Pat. No. 5,131,682 for a Seat Belt Apparatus for Sleepers. A conventional lap belt, although inadequate without the additional support of a shoulder belt, at least has the advantage of being routed around the passenger's hip, providing skeletal protection to the vital organs. The Seat Belt Apperatus for Sleepers, however, does not offer even this protection since, in the prone position, the passenger must wear the belt around the waist, where there is no skeletal resistance to internal injury caused by the belt, under the tremendous forces unleashed in a collision.

Another restraint is patented, not as a safety restraint, but as an infant accessory which can be employed in several different applications including the interior of a motor vehicle, as a baby bed. This versatile device, U.S. Pat. No. 2,742,651 issued to Thomas C. Ward on Apr. 24, 1956, was designed in an era before the seat belt law was a consideration and makes no attempt, at nor claims of, crash protection. This device was designed as a protection against the baby's rolling off the seat during a nap or a sudden stop. Clearly, this device would be inadequate as a safety restraint in a collision situation as it provides no means of anchorage to the floor or any other structural element of the vehicle. In fact, it provides only for a means of keeping the device positioned, as opposed to an actual anchorage. It has straps, to the ends of which are attached pieces of foam rubber, which are pushed through the space between the seat and the seat back and hold the device in position. In the event of even a minor collision, such restraining members would pull free of their moorings. Clearly, then, it was not the intention of the inventor to provide safety for an infant in the event of a collision and, as noted above, no such provision is claimed. It is important to note here that this device is intended only for infants.

Neither of the above-referenced examples of prior art offer adequate protection in the event of a collision. Neither provides any protection in a side impact collision.

What is needed, then, is a safety restraint blanket that adresses the same dangers as does the well known lap-shoulder belt, that can be adjusted to fit the wearer's torso ergonomically and comfortably and that is securely anchored in accordance with the seat belt law. Such a restraint should also address the dangers of a possible side impact collision. Such a device is currently lacking in the prior art.

SUMMARY OF THE INVENTION

In one embodiment of the present invention, a structural element within the rear hem of the safety restraint blanket is secured between the seat and its back rest by means of two lengths of seat belt webbing, which are anchored to the floor of the vehicle behind the seat. Also secured to this element are two of the four buckles used to restrain the wearer, the other two being anchored independently. Within the leading hem, a similar structural element is used to secure three of four corresponding latch plates and the necessary webbing to the leading hem, the fourth being stitched to the bottom hem. With the blanket surrounding the torso of the reclining passenger, who lies on his/her side with the back against the seat back, the buckles and latch plates are engaged and adjusted to snugly fit and conform to the torso. The two independently anchored buckles are situated on the seat at a distance from and angle to the top and bottom hems of the blanket such that when their latch plates are engaged and tightened they each exert equal and opposite tension on the restraint, restricting lateral movement in the event of a side impact collision.

In another embodiment, the restraint uses a retractor designed to accept the blanket, which is bolted to the floor of the vehicle.

One object of the present invention is to provide a safety restraint blanket that provides the same degree of safety for a reclining passenger as a lap-shoulder belt provides for a sitting passenger, while providing additional protection from side impact injuries.

Another object of this invention is to accomplish the above through the means of known seat belt buckles, latch plates, and known means of anchorage.

Yet another object of this invention is to provide a safety restraint blanket that can work with a retractor.

BRIEF DESCRIPTION OF THE DRAWINGS

FIG. 2 is the same view, showing a passenger buckled in.

DESCRIPTION OF THE PREFERRED EMBODIMENT

Figure 1:
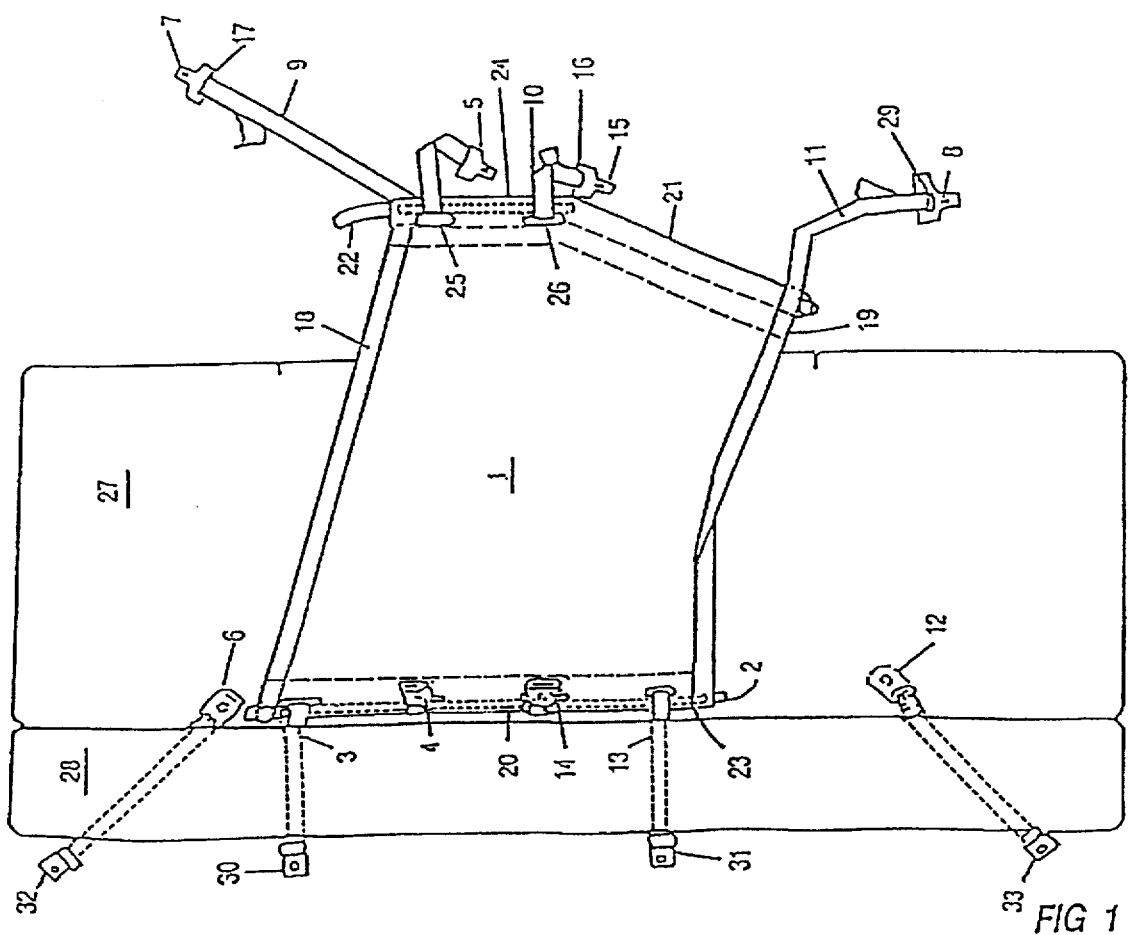
FIG. 1 is a plan drawing of the seat and blanket, fully extended and ready for use.

Referring now to FIG. 1, there is shown a safety restraint blanket of the preferred embodiment, which is constructed of a woven cloth material and is designated generally by the number 1. At 20 is seen the rear hem, which contains a length of rubber tubing 2, which, in turn, contains a shorter length of metal tubing 23. This serves as the primary structural element to which are secured a length of webbing 3 near the top hem and another length of webbing 13 near the bottom hem, which are routed between the seat 27 and the seat back 28 to the floor of the vehicle, where they are attached to brackets 30 and 31 respectively, which are, in turn, bolted to the floor of the vehicle. Also secured to this element are seat belt buckle 4 and seat belt buckle 14, which correspond to latch plate 5 and latch plate 15, which are secured to the leading hem 21 by means of a secondary structural element 24, within another length of rubber tubing 22. Buuckle 6 is anchored independently of the device, to bracket 32, and positioned about three inches away from the top hem 18 in between the seat 27 and the seat back 28. Buckle 12 is anchored and positioned in the same manner to bracket 33 about six inches below the bottom hem 19. A length of seat belt webbing 9 is slidably attached to the top of the leading hem through reinforced hole 25. At the top end of webbing 9, latch plate 7 is adjustably attached at roller 17 and at the bottom end, latch plate 5 is fixedly attached. Latch plate 15 is adjustably attached at roller 16 to seat belt webbing 10, which is, in turn, fixedly attached to the leading hem through reinforced hole 26. A fourth latch plate 8 is adjustably attached at roller 15 to seat belt webbing 11, which is, in turn, stitched to lower hem 19. Both upper hem 18 and lower hem 19 are reinforced with seatbelt webbing. Multiple stitching with nylon carpet thread is used throughout.

Figure 2:
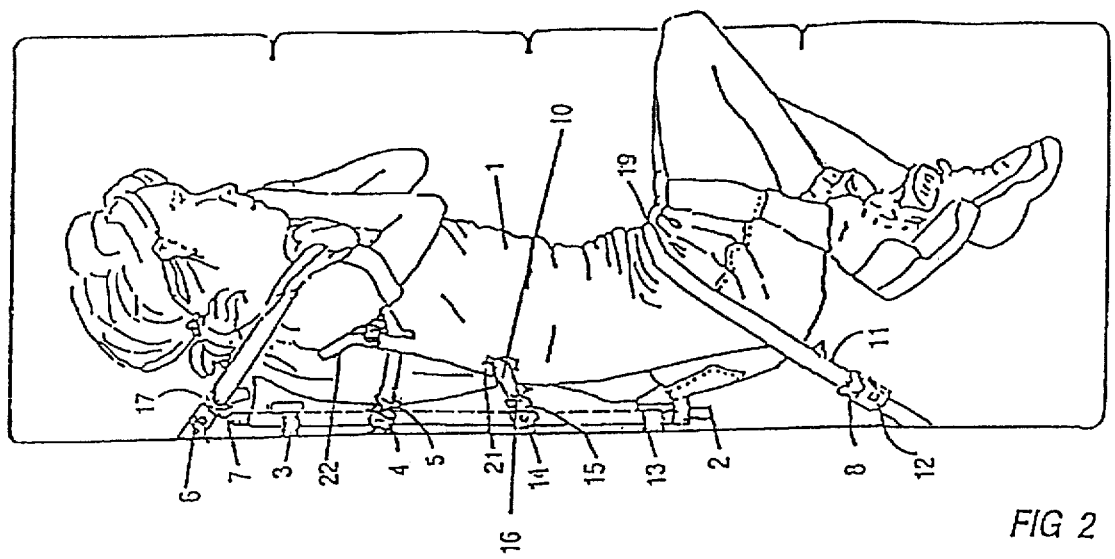

As shown in FIG. 2, the passenger is positioned on his/her side, with the back against the seat back. When latch plate 7 is releasably attached at buckle 6 and latch plate 5 is releasably attached at buckle 4, belt 9 adjusts equally at the shoulder and under the arm by means of roller 17. These attachments secure the upper torso. Buckle 14 engages latch plate 15 and webbing 10, adjustably attached thereto at roller 16, which is, in turn, attached to the leading hem by means of the secondary structural element 24. This attachment secures the lower rib cage area of the torso. When latch plate 8 engages buckle 12, the lower hem 19 and webbing 11 are adjusted at roller 29 to firmly contain the hip bone and the entire lower torso.

Figure 3:
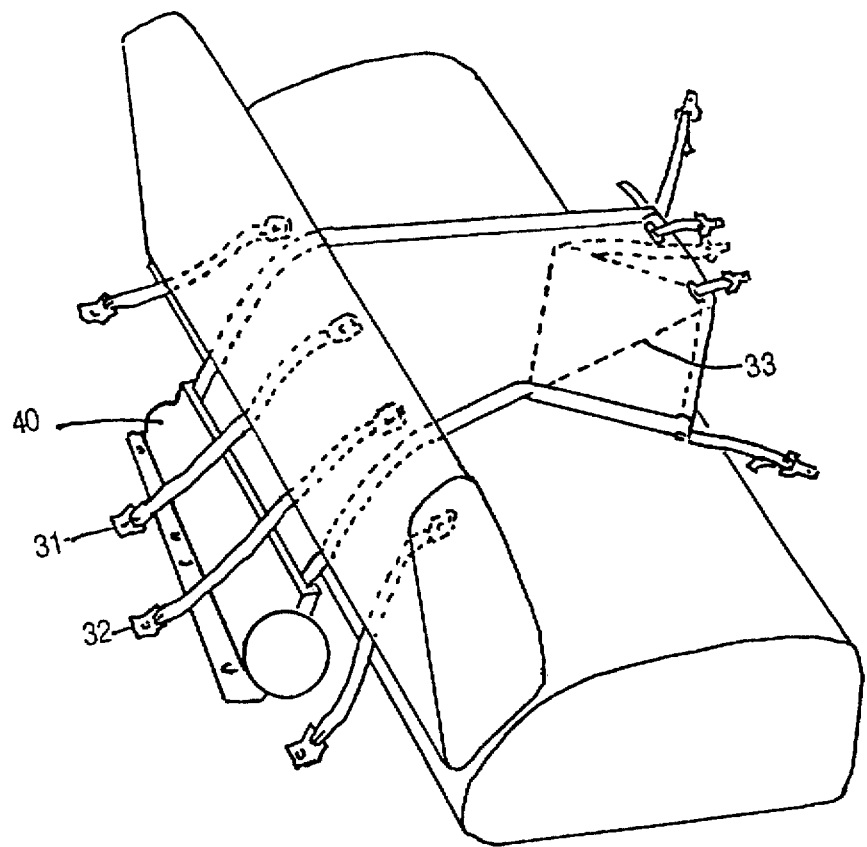
FIG. 3 is a rear perspective view of the retractable embodiment of the Motor Vehicle Safety Restraint Blanket, showing the mounting of the retractor and the two center buckles.

An alternative embodiment is shown in FIG. 3 wherein a retractor 30, designed to accept the entire width of the restraint blanket, is bolted to the floor of the vehicle behind the rear seat. The restraint, when not in use, is folded along dashed line 33 and is taken up on a retractor 30, such that the leading hem is pulled back into the crease between the seat and the seat back. In this embodiment, buckle 4 and buckle 14 are not mounted to the rear hem of the restraint but are attached, by lengths of seat belt webbing, to brackets 31 and 32 respectively, which are bolted to the floor of the vehicle directly behind the retractor. The webbing is routed from the buckle over the restraint and the retractor to its anchorage such that the blanket is pulled back under the buckles as it is taken up on the retractor.

The foregoing description of the present invention has been presented for the purposes of illustration and description. It is not intended to be exhaustive or to limit the invention to the precise form disclosed. Many modifications and variations are possible within the spirit and scope of the above teaching. It is intended that the scope of this invention be limited not by this detailed description but, rather, by the claims appended thereto.

I claim:

1. A motor vehicle safety restraint blanket for use by a reclining or sleeping passenger on a seat having a back comprising:
   a. a blanket of a woven material that is reinforced at the upper and lower hem with seat belt webbing, having
   b. a primary structural element within the rear hem of the restraint as a means of anchorage to the floor of the vehicle;
   c. a secondary structural element within the leading hem of the restraint, which is the means of mounting
   d. a slidably attached length of webbing, having a first end and a second end;
   e. a fixedly attached second length of webbing, having a single third end;
   f. a third length of webbing, having a fourth end, fastened to the lower hem of the restraint blanket;
   g. four latch plates and means of attachment to each of the aforementioned webbing ends;
   h. means of adjusting each of the three lengths of webbing at the leading hem;
   i. two seat belt buckles anchored to the primary structural element within the rear hem to receive two correspinding latch plates mounted on the leading hem; and
   j. two seat belt buckles, anchored independently of the rear hem, at a distance from each end of it, corresponding to the other two latch plates on the leading hem.

2. The safety restraint of claim 1, wherein the rear hem is secured to the take-up reel of a retractor, which is bolted to the floor of the vehicle.

* * * * *